United States Patent [19]

Satow et al.

[11] Patent Number: 4,498,429
[45] Date of Patent: Feb. 12, 1985

[54] FUEL INTAKE SYSTEM FOR SUPERCHARGED ENGINE

[75] Inventors: Haruhiko Satow; Haruo Okimoto; Shigeru Sakurai; Hiroyuki Oda, all of Hiroshima, Japan

[73] Assignee: Mazda Motor Corporation, Hiroshima, Japan

[21] Appl. No.: 414,858

[22] Filed: Sep. 3, 1982

[30] Foreign Application Priority Data

Sep. 7, 1981 [JP] Japan .................................. 56-141344
Sep. 21, 1981 [JP] Japan .................................. 56-150420

[51] Int. Cl.³ ........................ F02B 29/00; F02B 33/00; F02M 69/00
[52] U.S. Cl. ............................... 123/26; 123/308; 123/432; 123/559; 123/564; 123/585
[58] Field of Search ................ 123/432, 308, 306, 559, 123/564, 26, 585

[56] References Cited

U.S. PATENT DOCUMENTS

| | | | |
|---|---|---|---|
| 1,651,250 | 11/1927 | Brownback | 123/559 |
| 1,892,124 | 11/1928 | Abell | 123/433 |
| 2,016,846 | 3/1932 | Waseige | 123/559 |
| 3,665,905 | 5/1972 | Brille et al. | 123/559 |
| 3,964,451 | 6/1976 | Goto | 123/432 |
| 4,062,333 | 12/1977 | Matsuda et al. | 123/564 |
| 4,315,489 | 2/1982 | Tadokoro et al. | 123/213 |
| 4,350,135 | 9/1982 | Casey et al. | 123/564 |

FOREIGN PATENT DOCUMENTS

| | | | |
|---|---|---|---|
| 657993 | 3/1938 | Fed. Rep. of Germany | 123/564 |
| 519 | 1/1981 | Japan | 123/432 |
| 85522 | 7/1981 | Japan | 123/432 |

OTHER PUBLICATIONS

*Automotive Engineering,* "Supercharging for Fuel Economy", Jun. 1981.

*Primary Examiner*—Craig R. Feinberg
*Assistant Examiner*—David A. Okonsky
*Attorney, Agent, or Firm*—Burns, Doane, Swecker and Mathis

[57] ABSTRACT

A fuel intake system for a supercharged engine including an engine driven supercharger comprises a primary intake passage having a primary throttle valve for controlling the flow of an air-fuel mixture to be supplied to the engine, an auxiliary intake passage having an auxiliary throttle valve for controlling the flow of at least an air supercharged by the supercharger and adapted to be supplied to the engine, and an electromagnetic clutch for initiating and interrupting the transmission of the drive from the engine to the supercharger. The clutch is in position to establish the drive transmission between the supercharger and the engine only during the high load engine operating condition.

12 Claims, 3 Drawing Figures

FUEL INTAKE SYSTEM FOR SUPERCHARGED ENGINE

BACKGROUND OF THE INVENTION

The present invention relates to a fuel intake system for a supercharged internal combustion engine.

The Japanese Laid-open patent publication No. 55-137314, laid open to public inspection on Oct. 27, 1980, discloses a fuel intake system for a supercharged engine which comprises a primary intake system and an auxiliary intake system including a supercharger driven by a drive unit, for example, the engine. This prior art fuel intake system is so designed that, when and so long as the load on the engine is smaller than a predetermined value, only the primary intake system is brought into operation to supply a combustible air-fuel mixture into the engine through an associated primary intake port, but when and so long as the load on the engine is larger than the predetermined value and at least during the period in which the engine undergoes the compression stroke, the auxiliary intake system is brought into operation together with the primary intake system to allow a supercharged air from the supercharger to be supplied into the engine through an associated auxiliary intake port.

This prior art system appears advantageous in that, since the supercharger is driven by the engine in contrast to a turbocharger driven by exhaust gases emitted from the engine, the supply of the supercharged air into the engine would not be short of the required amount even at a low speed engine operating condition during which the flow of the exhaust gases through the exhaust manifold tends to be retarded.

This publication also discloses the use of an auxiliary throttle valve, situated in the auxiliary intake passage downstream of the supercharger with respect to the direction of flow of the supercharged air towards the engine, and also a relief passage having a relief valve and bypassing the supercharger. According to this prior art system, the supercharger is continuously driven by the drive unit, for example, the engine, irrespective of the engine operating condition, and therefore, the relief passage is brought into operation during the period in which no supply of the supercharged air into the engine is required. Specifically, during that period, the supercharged air emerging from the supercharger is relieved back to the supercharger through the relief valve without flowing past the auxiliary throttle valve.

The fact that the supercharger is continuously driven by the engine even during the period in which no supply of the supercharged air is required is disadvantageous in that the engine is unnecessarily loaded and, accordingly, the engine tends to consume the relatively increased amount of fuel.

The prior art system now under discussion has an additional disadvantage. That is, if the timing at which the auxiliary throttle valve, which is seemingly effective to avoid any possible back-flow of the air-fuel mixture from the engine into the auxiliary intake passage, is to be controlled deviates from its timed relationship to the start of the supercharger, i.e., the change in pressure of the supercharged air in the auxiliary intake passage downstream of the supercharger, not only may an abrupt change in engine power output occur, but the servicing life of the supercharger may also be adversely affected because it is drivingly coupled to the engine.

SUMMARY OF THE INVENTION

Accordingly, the present invention has been developed with a view to substantially eliminating the disadvantages and inconveniences inherent in the prior art fuel intake system for the supercharged engine and has for its essential object to provide an improved fuel intake system for the supercharged engine wherein means is provided for interrupting the drive of the supercharger during the period in which no supply of the supercharged air into the engine is required.

Another important object of the present invention is to provide an improved fuel intake system of the type referred to above, wherein means is also provided for synchronizing the timing at which the auxiliary throttle valve is to be controlled with the start of the supercharger.

A further object of the present invention is to provide an improved fuel intake system of the type referred to above, wherein the supply of the supercharged air into the engine can advantageously be effected in quick response to change in pressure in the auxiliary intake passage downstream of the supercharger.

A still further object of the present invention is to provide an improved fuel intake system of the type referred to above, which is simple in construction, reliable in operation and reasonably inexpensive to manufacture.

According to the present invention, because of the provision of the drive interrupting means disposed between the supercharger and a drive unit, for example, the engine, it is possible to interrupt the drive of the supercharger during the period in which no supply of the supercharged air is required, that is, during a low load engine operating condition. Preferably, this drive interrupting means comprises an electromagnetic clutch adapted to be controlled by a control unit for detecting, and generating an electrical signal indicative of, the occurrence of the low load engine operating condition. In a preferred embodiment, this control unit is constituted by a throttle sensor for detecting the position or opening of the primary or auxiliary throttle valve.

In another preferred embodiment of the present invention, the fuel intake system is provided with a timing control means, which may be constituted by a diaphragm valve assembly, for permitting the supply of the supercharged air into the engine at least during the period in which the engine undergoes the compression stroke. As a matter of course, since the supercharged air emerges from the supercharger when and so long as the latter is driven, it will readily be seen that the timing control means is operable during low load engine operating condition and, yet, at least during the period in which the engine undergoes the compression stroke.

According to the present invention, since the supercharger need not be unnecessarily be driven, not only can the servicing life of the supercharger be substantially prolonged, but also the fuel consumption of the engine can be minimized. In addition, any possible back-flow of the air-fuel mixture inside the engine into the auxiliary intake passage will not substantially occur even during the period in which the engine undergoes the compression stroke because of the provision of the timing control means effective to cause the auxiliary throttle valve to close the auxiliary intake passage during such period.

BRIEF DESCRIPTION OF THE DRAWINGS

These and other objects and features of the present invention will become clear from the following detailed description taken in conjunction with preferred embodiments of the present invention with reference to the accompanying drawings, in which.

DETAILED DESCRIPTION OF PREFERRED EMBODIMENTS

Figure 1:
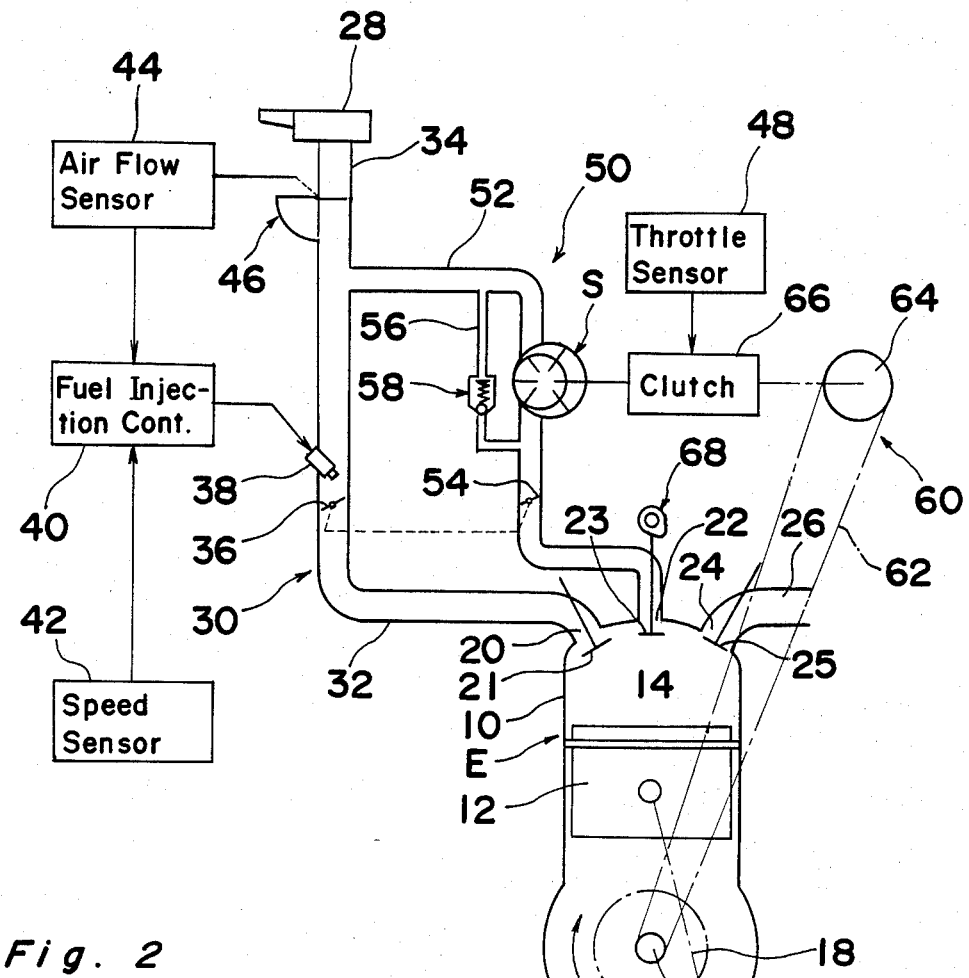
FIG. 1 is a schematic diagram showing a supercharged internal combustion engine together with its fuel intake system according to a preferred embodiment of the present invention.

Before the description of the present invention proceeds, it is to be noted that like parts are designated by like reference numerals throughout the accompanying drawings.

Referring first to FIG. 1, there is shown an internal combustion engine E comprising a cylinder casing 10, a piston 12 accommodated axially reciprocately movably within the cylinder casing 10 and defining a combustion chamber 14 of variable volume in cooperation with the cylinder casing 10, and a crank shaft 16 operatively coupled to the piston 12 through a connecting rod 18 and adapted to rotate as the piston 12 undergoes a linear motion as is well known to those skilled in the art.

The engine E has a primary intake port 20, an auxiliary intake port 22 and an exhaust port 24 which are defined in the cylinder casing 10 in communication with the combustion chamber 14 and which are adapted to be selectively opened and closed by a primary intake valve 21, an auxiliary intake valve 23 and an exhaust valve 25, respectively, in a predetermined timed sequence. While the exhaust port 24 is communicated to the atmosphere through an exhaust manifold 26 with or without any known exhaust gas purifier installed on the manifold 26, the primary and auxiliary intake ports 20 and 22 are communicated to the atmosphere through primary and auxiliary intake systems, as will be described later, by means of an air cleaner 28 common to these intake systems.

The primary intake system, generally identified by 30, comprises a primary intake passage 32 having one end communicated to a common duct 34 which is in turn communicated to the atmosphere through the air cleaner 28, and the other end communicated to the primary intake port 20, a primary throttle valve 36 for regulating the flow of combustible air-fuel mixture to be supplied into the combustion chamber 14 and a fuel injection nozzle 38 positioned upstream of the primary throttle valve 36 with respect to the direction of flow of the air-fuel mixture towards the combustion chamber 14 and operable to inject fuel into the primary intake passage 32 under the control of a fuel injection control unit 40. As is well known to those skilled in the art, the fuel injection control unit 40 is adapted to receive an electrical signal indicative of the engine speed detected by an engine speed sensor 42, and an electrical signal indicative of the flow of air through the common duct 34 detected by an air flow sensor 44 and is operable to cause the injection nozzle 38 to inject fuel at a rate appropriate to a particular engine operating condition represented by a combination of the engine speed and the rate of flow of the air. The air flow sensor 44 so far shown comprises a known air flow meter 46 having a measuring plate disposed on the common duct 34 and a potentiometer (not shown) for converting the angular displacement of the measuring plate of the flow meter 46 into the electrical signal for the indication of the rate of flow of the air drawn into the primary intake passage 32.

The primary throttle valve 36 is, as is well known, controlled by a foot-operated acceleration pedal and, for this purpose, is operatively coupled to the acceleration pedal (not shown) by means of a suitable linkage system (also not shown).

The auxiliary intake system, generally identified by 50, comprises an auxiliary intake passage 52 having one end communicated to the common duct 34 and the other end communicated to the auxiliary intake port 22, a supercharger S, an auxiliary throttle valve 54 disposed downstream of the supercharger S with respect to the direction of flow of supercharged air towards the combustion chamber 14 for regulating the flow of the supercharged air to be supplied into the combustion chamber 14, and a relief passage 56 having a relief valve 58 disposed thereon.

The supercharger S is comprised of, for example, a vane-type compressor and is adapted to be driven by the engine E through a drive transmission system 60. The drive transmission system 60 comprises an endless belt 62 suspended around and between the crank shaft 16 and a pulley 64, and an electromagnetic clutch 66 for selectively coupling and decoupling the pulley 64 to and from the supercharger S, respectively.

The relief valve 58 on the relief passage 56 serves to maintain at a predetermined value the supercharged pressure, i.e., the pressure of the supercharged air, inside a portion of the auxiliary intake passage 52 between the supercharger S and the auxiliary throttle valve 54. Specifically, this relief valve 58 is operable to permit a portion of the supercharged air to flow back towards the suction side of the supercharger S, for example, a portion of the auxiliary intake passage 52 between the common duct 34 and the supercharger S, when the supercharged pressure exceeds the predetermined value.

The auxiliary throttle valve 54 is so operativley linked to the primary throttle vavle 36 or, alternatively, to the acceleration pedal if desired, that it can open only when and after the primary throttle valve 36 has been moved a predetermined angle from the substantially closed position towards the full open position, that is, when and after the load imposed on the engine E has exceeded a predetermined value. This auxiliary throttle valve 54 serves not only to regulate the flow of the supercharged air, but also to prevent a portion of the air-fuel mixture, which has been supplied into the combustion chamber 14, from flowing into the auxiliary intake passage 52, particualrly into the supercharger S during the opening of the auxiliary intake port 22. This dual function of the auxiliary throttle valve 54 can be accomplished particularly where the auxiliary throttle valve 54 is positioned at a location as close to the auxiliary intake port 22 as possible, for example, at a joint between the engine E and the auxilary intake passage 52.

Figure 2:
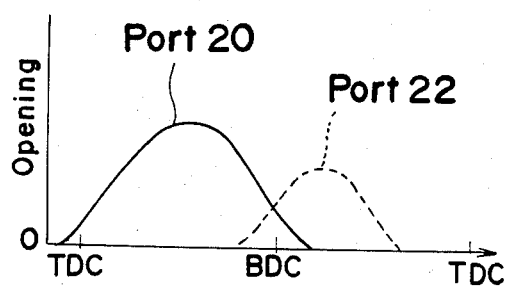
FIG. 2 is a schematic graph showing the respective timing at which the primary and auxiliary intake valves are sequentially opened relative to the position of the engine piston.

The movement of the auxiliary intake valve 23 for selectively opening and closing the auxiliary intake port 22 is controlled by a timing cam 68. This timing cam 68 is so designed as to cause the auxiliary intake valve 23 to selectively open and close the auxiliary intake port 22 in timed relation to the opening and closing of the primary intake port 20. Specifically, the primary and auxiliary intake valves 21 and 23 are so timed that, as shown in FIG. 2 wherein the legends "TDC" and "BDC" represent the top dead center position and the bottom dead center position, respectively, of the piston 12, at the final stage of the opening of the primary intake port 20, that is, during the transit from the intake stroke to the compression stroke, the auxiliary intake port 22 opens in overlapping relation to the opening of the primary intake port 20. However, where any countermeasure is desired to be taken to avoid any possible back-flow of the air-fuel mixture from the combustion chamber 14 into the primary intake passage 32, the valves 21 and 23 may be so timed as to open the auxiliary intake port 22 immediately after the complete closure of the primary intake port 20 by the primary intake valve 21, that is, during the compression stroke of the engine E.

The fuel intake system of the construction so far described is so designed that, when and so long as the load imposed on the engine E is smaller than the predetermined value, only the primary intake system 30 is brought into operation to supply the air-fuel mixture into the combustion chamber 14 through the primary intake passage 32, but when and so long as the load on the engine E exceeds the predetermined value, both of the primary and auxiliary intake systems are brought into operation in such a way that, at least during the compression stroke, the supercharged air from the supercharger S is supplied into the combustion chamber 14 through the auxiliary intake passage 52 simultaneously with the supply of the air-fuel mixture into the chamber 14 through the primary intake passage 32.

In accordance with the present invention, a throttle sensor 48 for detecting the opening or position of the auxiliary throttle valve 54 is so electrically connected to the electromagnetic clutch 66 that the clutch 66 can be energized to drivingly couple the pulley 64 to the supercharger S during the opening of the auxiliary throttle valve 54 (that is, during a high load engine operating condition in which the load on the engine is higher than the predetermined value), but it can be deenergized to disconnect the pulley 64 from the supercharger S during the closure of the auxiliary throttle vavle 54 (that is, during a low load engine operating condition in which the load on the engine is lower than the predetermined value). It is to be noted that the throttle sensor 48 may be used to detect, and generate an electrical signal indicative of the opening of the primary throttle valve 36 since the latter is operatively associated with the auxiliary throttle valve 54 as hereinbefore described. In this case, care is required to avoid any possible energization of the electromagnetic clutch 66 simultaneously with the opening of the primary throttle valve 36, in view of the fact that the operation of the electromagnetic clutch 66 is governed by the position of the auxiliary throttle valve 54 which, as hereinbefore described, opens after the primary throttle valve 36 has moved the predetermined angle from the substantially closed position towards the full open position.

From the foregoing, it has now become clear that during the high load engine operating condition, the throttle sensor 48 generates the electrical signal indicative of the opening of the auxiliary throttle valve 54 and, as a consequence, the electromagnetic clutch 66 is energized to allow the transmission of the drive from the pulley 64 to the supercharger S to drive the latter. During the drive of the supercharger S, the supercharged air is supplied into the combustion chamber 14 through the auxiliary intake passage 52 in quick response, mixing with the air-fuel mixture which has been supplied thereinto through the primary intake passage 32, and therefore, the engine E can exhibit a favorable power output characteristic. In addition, the control of the electromagnetic clutch 66 in dependence on the position of the auxiliary throttle valve 54 such as described and shown is advantageous in that the timing at which the supercharger S is to be driven can be rendered to coincide exactly with the timing at which the auxiliary throttle valve 54 is opened and, therefore, any abrupt change in torque will not take place in the engine E thereby improving the drivability of the engine.

On the other hand, during the low load engine operating condition, the throttle sensor 48 does not generate any electrical signal necessary to energize the electromagnetic clutch 66 and, therefore, the drive of the pulley 64 driven by the crank shaft 16 through the endless belt 62 will not be transmitted to the supercharger S. Under this condition, no supercharged air is supplied into the combustion chamber 14 through the auxiliary intake passage 52, but only the air-fuel mixture is supplied thereinto through the primary intake passage 32. Thus, since the supercharger S is not driven when and so long as no supply of the supercharged air into the combustion chamber is required, only the air-fuel mixture is supplied into the combustion chamber 14 through the primary intake passage 32 in a manner similar to that occurring in any conventional engine. In addition, under this condition, the drive transmission between the supercharger S and the pulley 64 is disconnected and any undesirable influence which would be brought on the supercharger S in the case where the latter is continuously driven such as in the prior art arrangement can be avoided accordingly. Moreover, since the supercharger S is driven by the engine E through the drive transmission system 60 in synchronism with the engine E, the fuel consumption of the engine can be improved.

Figure 3:
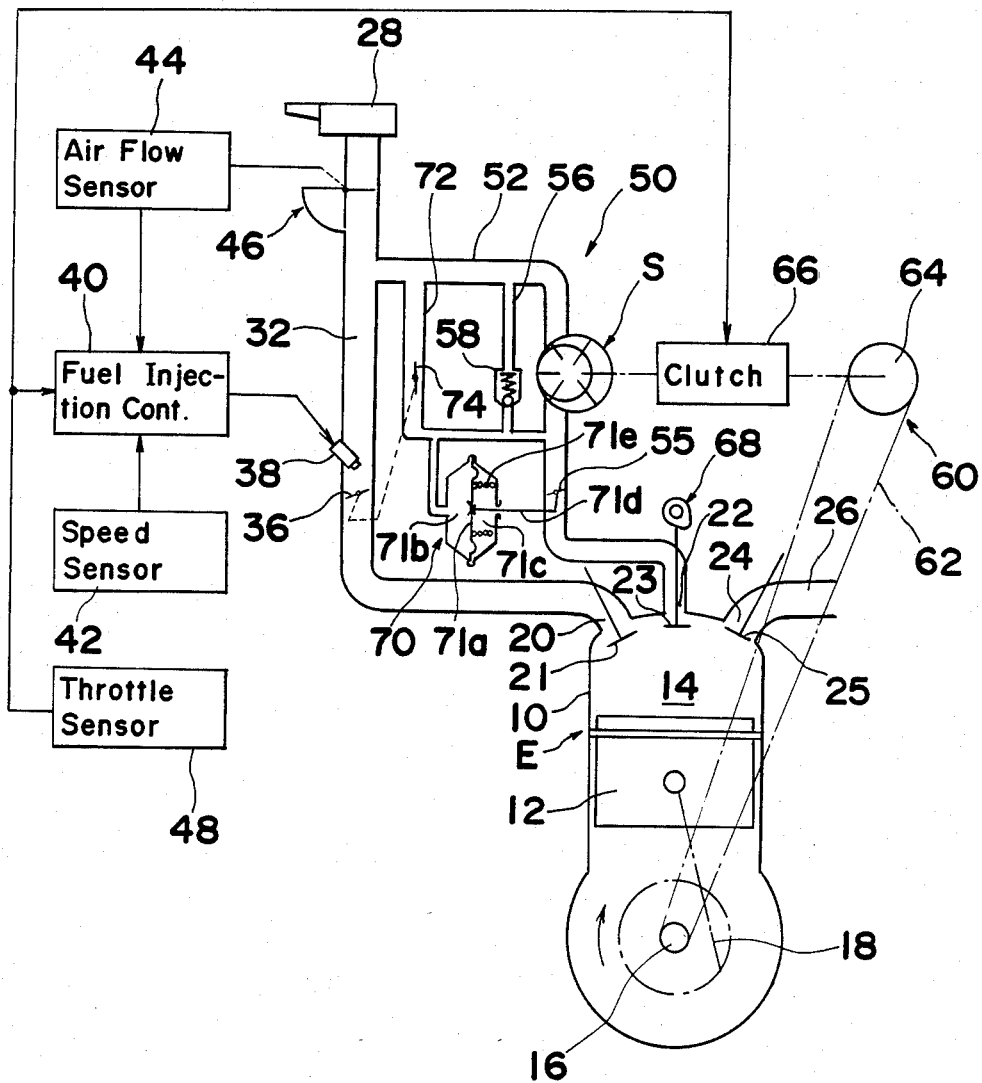
FIG. 3 is a diagram similar to FIG. 1, showing another preferred embodiment of the present invention.

The fuel intake system according to the embodiment shown in FIG. 3 is particularly so designed as to render the timing at which the auxiliary throttle valve to be matched substantially exactly with the set-up of the supercharged air. The arrangement shown in FIG. 3 is advantageous where the auxiliary throttle valve has the dual function as hereinbefore described. Specifically, the auxiliary throttle valve has to be closed during the low load engine operating condition, thereby to avoid any possible back-flow of the air-fuel mixture from the combustion chamber into the auxiliary intake passage, and has to be opened during the high load engine operating condition. However, during the period of transit from the low load operating condition to the high load operating condition, an undesirable increased pressure is created at a portion of the auxiliary intake passage between the supercharger and the auxiliary throttle valve if the timing at which the auxiliary throttle valve is opened is delayed relative to the set-up of the supercharged pressure and, on the other hand, the air-fuel mixture being compressed inside the combustion chamber may flow into the auxiliary intake passage if the timing at which the auxiliary throttle valve is opened is earlier than the set-up of the supercharged pressure. The undesirable increase in pressure in that portion of the auxiliary intake passage resulting from the delayed opening of the auxiliary throttle valve may result in the increased driving torque of the supercharger which in turn results in the increased load on the engine and also the overheating of the supercharger. On the other hand, the back-flow of the compressed airfuel mixture into the auxiliary intake passage resulting from the premature opening of the auxiliary throttle valve may result in the reduced engine power output and also the reduced servicing life of the supercharger. In other words, during the transit period, an abrupt change in engine speed tends to occur because of the increased drive resistance imposed on the supercharger or of the reduced engine output power.

This problem can be advantageously avoided according to the embodiment shown in FIG. 3, which will now be described in details.

The auxiliary throttle valve used in this embodiment is identified by 55 and, unlike that used in the foregoing embodiment of FIG. 1, is not operatively associated with the primary throttle valve 36. In view of this, the throttle sensor 48, which has been described as preferably positioned and designed so as to detect the opening of the auxiliary throttle valve in the foregoing embodiment, is so positioned and so designed as to detect, and generate the electrical signal indicative of the opening of the primary throttle valve 36, the electrical signal from the sensor 48 in the embodiment of FIG. 3 being also applied to the fuel injection control unit 40 as one of the parameters necessary to be taken into account in the determination of the rate of supply of the fuel into the primary intake passage 32 through the injection nozzle 38 (This is also applicable to the foregoing embodiment of FIG. 1.).

The auxiliary throttle valve 55 is controlled by a diaphragm valve assembly 70 which is in turn controlled by the supercharged air. A bypass passage 72 extends in parallel to the relief passage 56 and bypasses the supercharger S. The bypass passage 72 has a bypass throttle valve 74 so operatively associated with the primary throttle valve 36 as to be moved from an opened position towards a closed position after the primary throttle valve 36 being moved from the closed position towards the full open position has been moved a predetermined angular distance.

The diaphragm valve assembly 70 comprises a valve casing divided by a diaphragm member 71a into a working chamber 71b, communicated to a portion of the auxiliary intake passage 52 between the supercharger S and the auxiliary throttle valve 55, and an atmospheric chamber 71c communicated to the atmosphere, a connecting rod 71d connected at one end rigidly to the diaphragm member 71a and at the other end to the auxiliary throttle valve 55 through any suitable linkage system, and a biasing spring, for example, a compression spring 71e housed in the atmospheric chamber 71c for urging the diaphragm 71a to the left as viewed in FIG. 3 with the auxiliary throttle valve 55 consequently closed.

From the foregoing, it will readily be understood that, during the low load engine operating condition in which the opening of the primary throttle valve 36 is smaller than the predetermined value, the electromagnetic clutch 66 is in the decoupling position, i.e., in position to interrupt the transmission of the drive from the pulley 64 to the supercharger S, and therefore, the air-fuel mixture is supplied into the combustible chamber 14 only through the primary intake passage 32. At this time, the bypass throttle valve 74 is in the opened position. However, since no supercharged air emerges from the supercharger then held in an inoperative position and, therefore, the diaphragm member 71a remains biased to the left by the compression spring 71c, the auxiliary throttle valve 55 is held in the closed position. Consequently, the auxiliary throttle valve 55 in the closed position is effective to prevent the air-fuel mixture within the combustion chamber 14 from reaching the supercharger S and, therefore, to avoid any possible reduction in engine power output which would take place as a result of the back-flow bringing about the deviation of the compression ratio for the airfuel mixture in the combustion chamber 14.

When the primary throttle valve 36 is subsequently opened with its opening attaining the predetermined value as a result of the increase in load on the engine E, the electromagnetic clutch 66 is energized in response to the electrical signal from the throttle sensor 48 to connect the pulley 64 to the supercharger S to drive the latter, allowing the supercharger S to generate the supercharged air. However, since the opening of the bypass throttle valve 74 is still large at this time, the supercharged air emerging from the discharge side of the supercharger S circulates back to the suction side of the supercharger S through the bypass passage 72 with its pressure having not yet reached a predetermined value necessary to overcome the biasing force of the compression spring 71e.

As the primary throttle valve 36 is further opened with its opening exceeding the predetermined value, the bypass throttle valve 74 operatively associated therewith is moved from the opened position towards the closed position, the supercharged air circulating past the bypass throttle valve 74 gradually decreases with the corresponding increase in pressure in the working chamber 71b of the diaphragm valve assembly 70. Therefore, as the bypass throttle valve 74 is closed in association with the opening of the primary throttle valve 36, the auxiliary throttle valve 55 is opened in correspondence with the rightward displacement of the diaphragm member 71a, thereby allowing the supercharged air to be introduced into the combustion chamber 14 to mix with the air-fuel mixture which has been supplied thereinto through the primary intake passage 32.

It has now become clear that the auxiliary throttle valve 55 can open in correspondence with the increase of the supercharged pressure in high fidelity, and any possible disadvantage discussed hereinbefore does not occur. However, it is to be noted that, where the supply of the supercharged air into the combustion chamber 14 is desired to be initiated when and after the primary throttle valve 36 has been completely opened, the bypass passage 72 may not be required and, in such case, the working chamber 71b of the diaphragm valve assembly 70 should be communicated to that portion of the auxiliary intake passage 52 between the supercharger S and the auxiliary throttle valve 55.

Although the present invention has fully been described in connection with the preferred embodiments thereof with reference to the accompanying drawings, it is to be noted that various changes and modifications are apparent to those skilled in the art. By way of example, although in any one of the embodiments shown respectively in FIGS. 1 and 3, the supercharger S has been described as driven by the crank shaft 16 of the engine E by means of the drive transmission system 60, it may be driven by an electric motor. In this case, the clutch 66 has to be interposed between the supercharger S and the electric motor. In addition, for controlling the electromagnetic clutch 66, any electrical signal indicative of the parameter having its magnitude variable in dependence on the load on the engine E, such as, for example, the negative pressure, may be employed instead of the electrical signal indicative of the opening of the throttle valve.

Moreover, although the single injection nozzle 38 has been referred to in any one of the illustrated embodiments, another fuel injection nozzle may be employed for injecting the fuel into the auxiliary intake system in a controlled manner.

The use of a known carburetor system is also possible instead of the fuel injection system referred to in the foregoing embodiments. In this case, the carburetor has to be positioned upstream of the junction between the primary and auxiliary intake passages 32 and 52 to allow the fuel to be atomized in admixture with the air flowing past a venturi area. However, the present invention is particularly suited for use on the engine of fuel injection system in view of the fact that, where the carburetor is used, a portion of the air-fuel mixture flowing into the auxiliary intake passage tends to contaminate the supercharger S.

A mechanical clutch may also be used instead of the electromagnetic clutch 66 in any one of the foregoing embodiments.

Finally, the concept of the present invention can equally be applicable to any known rotary piston engine.

Accordingly, such changes and modifications are to be construed as included within the true scope of the present invention unless they depart therefrom.

We claim:

1. A fuel intake system for an internal combustion engine having a combustion chamber, said fuel intake system comprising, in combination:
   primary intake means for supplying a combustible airfuel mixture to the combustion chamber;
   auxiliary intake means including a supercharger for supplying at least supercharged air to the combustion chamber, said auxiliary intake means being operable during a high load engine operating condition to supply the supercharged air to the combustion chamber at least during a period in which the chamber undergoes a compression stroke;
   drive means adapted to be driven by the engine for driving the supercharger to cause the supercharger to produce the supercharged air;
   clutch means operable both to couple the supercharger to the drive means during the high load engine operating condition to drive the supercharger and to decouple the supercharger from the drive means during a low load engine operating condition to bring the supercharger to a halt; and
   control means provided in the auxiliary intake means for adjusting the pressure of the supercharged air, said control means including a bypass passage communicated at a first end to a portion of the auxiliary intake means between the supercharger and a flow control valve arranged in the auxiliary intake means downstream of the supercharger, a second end of the bypass passage being communicated with another portion of the auxiliary intake means upstream of the supercharger, a bypass valve disposed in the bypass passage for controlling the effective cross-sectional area of the bypass passage, and a bypass valve actuator for opening and closing the bypass valve during the low load engine operating condition and during the high load engine operating condition, respectively independent of backflow upstream of said flow control valve.

2. The system as claimed in claim 1, wherein said clutch means comprises a detector for detecting the engine operating condition and for generating a signal when the load on the engine is high, and a clutch operable in response to the signal from the detector to couple the supercharger to the drive means.

3. The system as claimed in claim 1, wherein said drive means comprises a pulley adapted to be driven by the engine through an endless belt.

4. The system as claimed in claim 1, wherein said primary intake means includes a primary throttle valve operatively associated with the accelerator pedal for regulating the flow of the combustible air-fuel mixture therethrough, said bypass valve actuator includes linkage means connecting the primary throttle valve to the bypass valve.

5. The system as claimed in claim 1, wherein said auxiliary intake means includes valve means having a valve disposed in the auxiliary intake means, the opening and closing of said valve being controlled according to the magnitude of the supercharged air flowing toward the combustion chamber.

6. The system as claimed in claim 5, wherein said valve of said valve means opens when the pressure of the supercharged air is higher than a predetermined value.

7. The system as claimed in claim 6, further comprising actuator means for controlling the opening and closing of the valve means, said actuator means being comprised of a diaphragm valve assembly having a working chamber for receiving the supercharged air thereinto and including a diaphragm member displaceable between first and second positions, a connecting rod having one end rigidly connected to the diaphragm member and the other end operatively coupled to the valve, and a biasing element for urging the diaphragm member to the first position, said diaphragm member being displaced against the biasing element toward the second position when the pressure received in the working chamber exceeds the predetermined value to cause the valve to open.

8. A fuel intake system for an internal combustion engine having a combustion chamber, said fuel intake system comprising, in combination:
   primary intake means for supplying a combustible airfuel mixture to the combustion chamber through a primary intake passage, said primary intake means introducing air from the outside into said primary intake passage by negative pressure which the chamber undergoes during a suction stroke; and
   auxiliary intake means including a supercharger for supplying at least supercharged air to the combustion chamber through an auxiliary intake passage provided separately from said primary intake passage, said auxiliary intake means being operable during a high load engine operating condition to supply the supercharged air to the combustion chamber at least during a period in which the chamber undergoes a compression stroke, said auxiliary intake means also including valve means having a valve disposed in the auxiliary intake means at a location between the supercharger and the combustion chamber, means for controlling opening and closing of said valve according to the magnitude of the supercharged air flowing towards the combustion chamber such that said valve opens when the pressure of the supercharged air is higher than a predetermined value.

9. The system as claimed in claim 8, further comprising actuator means for controlling the opening and closing of the valve means, said actuator means being comprised of a diaphragm valve assembly having a working chamber for receiving the supercharged air thereinto and including a diaphragm member displaceable between first and second positions, a connecting rod having one end rigidly connected to the diaphragm member and the other end operatively coupled to the valve, and a biasing element for urging the diaphragm member to the first position, said diaphragm member being displaced against the biasing element toward the second position when the pressure received in the working chamber exceeds the predetermined value to cause the valve to open.

10. The system as claimed in claim 8, wherein said control means comprises a bypass passage communicated at one end to a portion of the auxiliary intake means between the supercharger and the valve and at the other end to another portion of the auxiliary intake means upstream of the supercharger, a bypass valve disposed in the bypass passage for controlling the effective cross-sectional area of the bypass passage, and a bypass valve actuator for opening and closing the bypass valve during the low load engine operating condition and during the high load engine operating condition, respectively.

11. The system as claimed in claim 10, wherein said primary intake means includes a primary throttle valve operatively associated with the accelerator pedal for regulating the flow of the combustible air-fuel mixture therethrough, said bypass valve actuator including linkage means connecting the primary throttle valve to the bypass valve.

12. The system as claimed in claim 10, further comprising drive means adapted to be driven by the engine for driving the supercharger, and clutch means operable both to couple the supercharger to the drive means during the high load engine operating condition to drive the supercharger and to decouple the supercharger from the drive means during a low load engine operating condition to bring the supercharger to a halt.

* * * * *